United States Patent [19]
Aarseth

[11] Patent Number: 5,998,963
[45] Date of Patent: Dec. 7, 1999

[54] ELECTRIC VEHICLE SERVICE CENTER AND METHOD FOR EXCHANGING AND CHARGING VEHICLE BATTERIES

[76] Inventor: Einar Aarseth, 18415 NE 170th St., Woodinville, Wash. 98072

[21] Appl. No.: 09/096,407

[22] Filed: Jun. 11, 1998

[51] Int. Cl.[6] ............................... B60D 5/00; H02J 7/00; B65G 1/00
[52] U.S. Cl. ..................... 320/109; 104/34; 414/283; 414/285
[58] Field of Search ................................. 320/109, 107; 104/34; 414/281, 282, 283, 284, 285, 286

[56] References Cited

U.S. PATENT DOCUMENTS

| | | | |
|---|---|---|---|
| 4,102,273 | 7/1978 | Merkle et al. | 104/34 |
| 4,450,400 | 5/1984 | Gwyn | 320/109 |
| 4,998,858 | 3/1991 | Magens | 414/495 |
| 5,508,597 | 4/1996 | Parmley, Sr. | 320/2 |
| 5,545,967 | 8/1996 | Osborne et al. | 320/109 |
| 5,612,606 | 3/1997 | Guimarin et al. | 320/109 |
| 5,711,648 | 1/1998 | Hammerslag | 414/800 |

*Primary Examiner*—Peter S. Wong
*Assistant Examiner*—Gregory J. Toatley
*Attorney, Agent, or Firm*—Dean A. Craine

[57] ABSTRACT

Disclosed herein is a service center and method designed to promote the use of a battery-powered, electric vehicle which allows a discharged battery to be easily and quickly replaced in the electric vehicle and then recharged for use in another electric vehicle. The service center and method uses a plurality of universally-adaptable batteries capable of being used in most, if not all, battery-powered, electric vehicles. The batteries are designed to be lifted into or lowered from a battery receiving space formed on the bottom of an electric vehicle. During use, the electric vehicles are driven into a service center. The batteries are unlocked from the vehicle and then conveniently removed and transported to a recharging unit located in the nearby recharging center. A second, recharged battery is then removed from the recharging unit and transported to the electric vehicle. The second battery is then installed and locked in position in the electric vehicle. By using the service center and method, the heavy electric battery is easily handled and the lengthy waiting time for recharging the battery is eliminated, thus making it possible to travel unlimited distances in the electric vehicle.

13 Claims, 7 Drawing Sheets

FIG. 13

ELECTRIC VEHICLE SERVICE CENTER AND METHOD FOR EXCHANGING AND CHARGING VEHICLE BATTERIES

BACKGROUND OF THE INVENTION

1. Field of the Invention

This invention relates generally to facilities used to promote the use of battery powered electric vehicles.

2. Description of the Related Art

New technological developments have been made to electric vehicles making them a viable alternative to combustion engine powered vehicles. Typically, electric vehicles are powered by lead-acid batteries which must be charged for several hours between uses. While new batteries are being developed, they still remain very heavy, store a relatively small electric charge, and require long recharging periods. Unless new batteries are developed which overcome these drawbacks, use of electric vehicles will continue to lag behind combustion engine powered vehicles.

The invention disclosed herein addresses several of these drawbacks by providing a means to quickly and conveniently exchange a discharged battery in an electric vehicle and replace it with a recharged battery. The discharged battery can then be recharged and exchanged with another discharged battery in another vehicle.

Currently, there are numerous devices and methods for removing a discharged battery or battery pack from an electric vehicle. U.S. Pat. No. 5,508,597 discloses a quick exchange battery apparatus which includes a pneumatic carrier that moves across a horizontal platform to remove the discharged battery pack from a vehicle and then replace it with a charged battery. U.S. Pat. No. 5,187,423 discloses the use of a forklift used to lift and remove the discharged battery from the vehicle. Other types of systems use a block and tackle hoist arrangement.

The problems associated with the above apparatus and methods is that they are not convenient and are too time consuming to use. As a result, such apparatus and methods do not promote the use of electric vehicles.

A means is needed which enables a discharged battery to be conveniently and quickly removed and exchanged in an electric vehicle. Such a means should include the use of standard shape and size batteries which are universally adaptable for use in many different kinds of electric vehicles, and can be easily removed from the vehicle and replaced with a recharged battery, and can be quickly recharged on site and then used in another electric vehicle.

SUMMARY OF THE INVENTION

It is an object of the present invention to provide a means which promotes the use of electric vehicles.

It is another object of the present invention to provide such a means which can be used with current battery technology.

It is a further object of the present invention to provide a service center which enables a battery for an electric vehicle to be conveniently and easily removed from the vehicle, replaced with another recharged battery, and means to recharge the discharged battery and install it into another vehicle.

Disclosed herein is a service center and method for servicing battery powered electric vehicles which overcomes some of the major problems associated with such vehicles, thereby promoting their usage. More particularly, the service center and method include the use of a plurality of standard, rechargeable batteries capable of being installed and used in different electric vehicles. The batteries must be capable of being used in a large number of electric vehicles so that the service center may easily remove and replace batteries and then process them in a minimal amount of space.

In the preferred embodiment, the electric vehicles are designed so that the batteries are installed and removed through an opening located on the bottom of the electric vehicle. A locking means is provided between the battery and the electric vehicle which enables the battery to be locked and unlocked from the electric vehicle. When unlocked, the battery may be removed vertically downward from the vehicle by a first lifting means located in a pit located beneath the vehicle. A transporting means located in the pit adjacent to the first lifting means is used to transport the discharged battery to a recharging center also located nearby in the service center. A second lifting means may be used to remove the discharged battery from the transporting means and deliver it to the recharging unit.

A previously recharged battery is then taken from the recharging center and installed in the electric vehicle. The transporting means is then used to transport the recharged battery to the first lifting means which then lifts the recharged battery into the electric vehicle. The locking means is then used to lock the recharged battery in the electric vehicle. The electric vehicle is then ready to proceed on its trip.

In the preferred embodiments disclosed herein, the first lifting means, transporting means, and the recharging center are located in the service center. The recharging center may contain a plurality of recharging units so that it can simultaneously recharge a large quantity of batteries.

The above described service center and method provides a very convenient, quick means for exchanging and recharging batteries in an electric vehicle which would promote the use of electric vehicles in our society.

DESCRIPTION OF THE PREFERRED EMBODIMENT(S)

Figure 1:
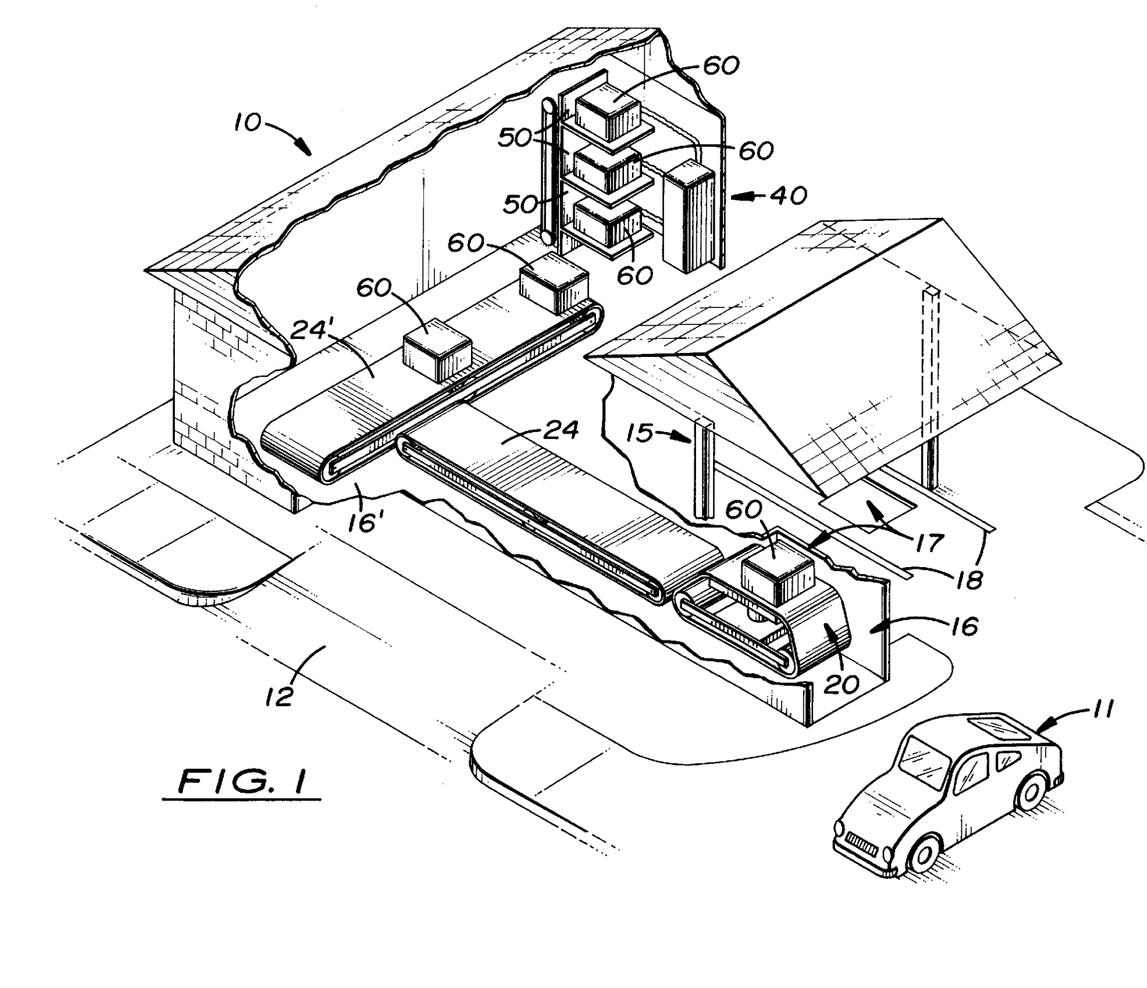
FIG. 1 is a perspective of the electric vehicle battery service center disclosed herein.
Figure 3:
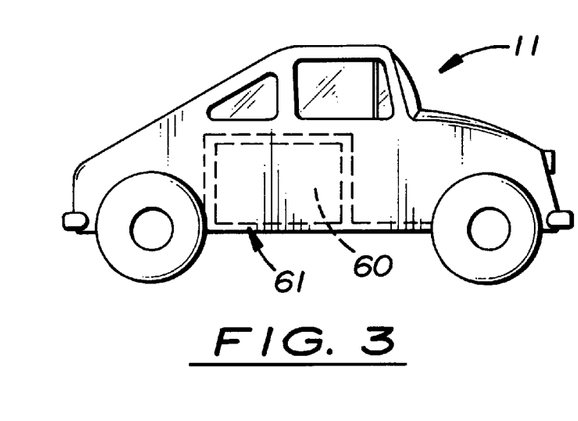
FIG. 3 is a side elevational view of a typical electric vehicle which uses the service center.

Referring to FIG. 1, wherein like numerals refer to like components, a service center 10 used to conveniently and quickly exchange and recharge a universally adaptable battery 60 from a battery powered electric vehicle 11. As shown in FIG. 3, each electric vehicle 11 uses a standard, universally adaptable battery 60 which is vertically installed and removed from a battery space 61 located in the electric vehicle 11.

Access to the battery space 61 is gained which through an opening located on the bottom of the vehicle 11. The battery 60 includes at least two battery terminals 62 which slidingly connect to electrical connecting terminals 63 located on the electric vehicle 11. The battery 60 is held in the battery space 61 during operation by latches 64 which extend inward and engage recessed surfaces 65 located on the sides of the battery 60. When the latches 64 disengage the recessed surfaces 65, the battery 60 can be removed vertically out of the battery space 61. It is important that standard shape and size batteries 60 and standardized battery terminals be used in electric vehicles 11 so that service centers, such as the one disclosed herein, may service a wide variety of different electric vehicles easily and quickly in a minimal amount of space.

The service center 10 is designed to operate similarly to an existing gasoline service station which typically has a plurality of driveways 12 with one or more loading/unloading bays 15. A partially covered elongated pit 16 is formed beneath each bay 15 which extends to a nearby recharging center 40. A top opening 17 is formed over the portion of the elongated pit 16 located in the bay 15. When an electric vehicle 11 is driven into the bay 15, the electric vehicle 11 is aligned so that the battery 60 is positioned directly over the top opening 17. An optional alignment means, comprising two lines 18 printed on the bay 15 may be used to assist a driver in properly aligning the electric vehicle 11 over the top opening 17.

The service center 10 includes a removal-installation means for removing the discharged battery 60 from the electric vehicle 11 and delivering it to the transporting means and for receiving the recharged battery from the transporting means and installing it into the vehicle. The service center 10 also includes a transporting means for transporting the discharged battery 60 to a recharging unit and transporting the recharged battery from the recharging unit to the removal-installation means. In the embodiment described herein, a plurality of recharging units capable of recharging a discharged battery 60 are located inside a recharging center 40. An optional, second lifting means is also provided for transporting the discharged and recharged batteries 60' between the transporting means and the recharging units 50.

Figure 7:
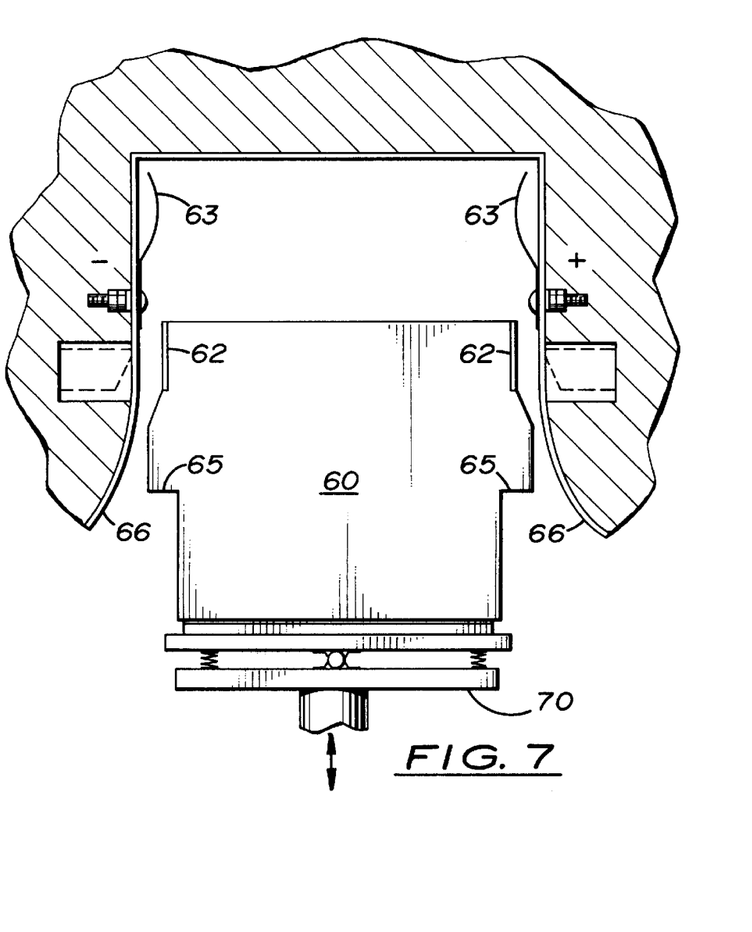
FIG. 7 is a side elevational view in section of a battery unlocked from the battery receiving space and removed from the electric vehicle.

The removal-installation means is disposed inside the pit 16 which is designed to extend upward through the top opening 17 and placed directly under the discharged battery 60 located in the electric vehicle 11. When the removal-installation means is positioned directly beneath to support the discharged battery 60, the latches 64 in the electric vehicle 11 are disengaged from the recessed surfaces 65 thereby disengaging the discharged battery 60 from the electric vehicle 11 as shown in FIG. 7. The removal-installation means then lowers the discharged battery 60 through the top opening 17 and into the pit 16. A transporting means is then used to transport the discharged battery 60 from the removal-installation means to the recharging center 40. When the discharged battery 60 arrives at the recharging center 40, it is placed into a recharging unit 50. A recharged battery 60', comparable to the discharged battery 60, is then selected and removed from one of the recharging units 50 and transported by the transporting means back to the removal-installation means. The recharged battery 60' is positioned on the removal-installation means and lifted through the top opening 17 and into the battery receiving space 61 located in the electric vehicle 11. When the recharged battery 60' is properly aligned and installed in the battery receiving space 61, the battery terminals 62 contact the terminals 63 located on the electric vehicle 11. After being properly installed, the latches 64 are then activated to engage the recessed surfaces 65 on the recharged battery 60'. The removal-installation means is then lowered into the pit 16 and the electric vehicle 11 is then ready to proceed on its trip.

Figure 2:
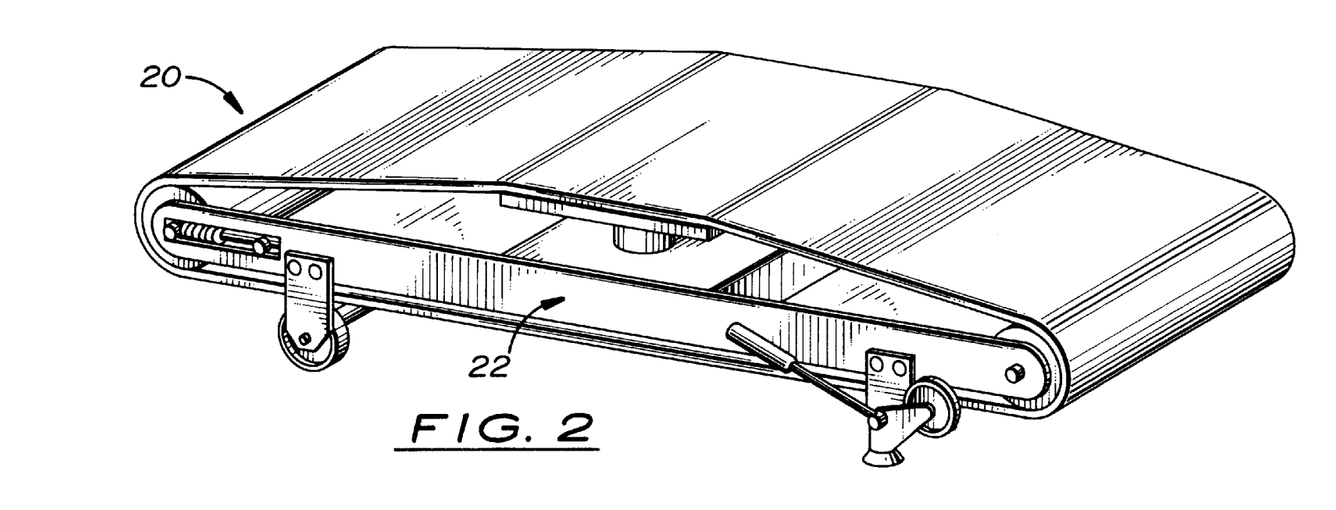
FIG. 2 is a perspective view of the conveyer lifting platform disclosed herein.

In one embodiment, shown in FIG. 2, the removal-installation means comprises a conveyor lifting platform 20 designed to operate inside the pit 16 and extend upward through the top opening 17. When a discharged battery 60 is placed on the conveyor lifting platform 20, the conveyor lifting platform 20 is lowered into the pit 16. The conveyor belt 21 on the conveyor lifting platform 20 is activated to transport the discharged battery 60 to the adjacent transporting means also located in pit 16. In one embodiment, the transporting means comprises an elongated conveyor 24 which extends longitudinally the entire length of the pit 16 to the recharging center 40. In some instances, a second pit 16' may be formed between the first pit 16 and the recharging center 40. An optional second elongated conveyor 24' is placed inside the second pit 16' to transport the battery 60 from the end of the first elongated conveyor 24 to the recharging center 40.

The discharged battery 60 may be deposited directly into one of the recharging units 50 located in the recharging center 40. In the preferred embodiment, the recharging center 40 contains a plurality of recharging units 50 so that a large quantity of batteries may be simultaneously processed. In order to do so, an optional second lifting means may be used to move the batteries from the transporting means to and from the individual recharging units 50. In the embodiment shown in FIGS. 4 and 5, the recharging units 50 are located on adjustable shelves 32 attached to a vertically aligned rack 30. The rack 30 is designed so that the individual shelves 32 can be selectively attached to a vertical support member 33. In the preferred embodiment, each shelf 32 includes a top rolling surface 35 which enables a battery 60 to move easily thereover.

Figure 4:
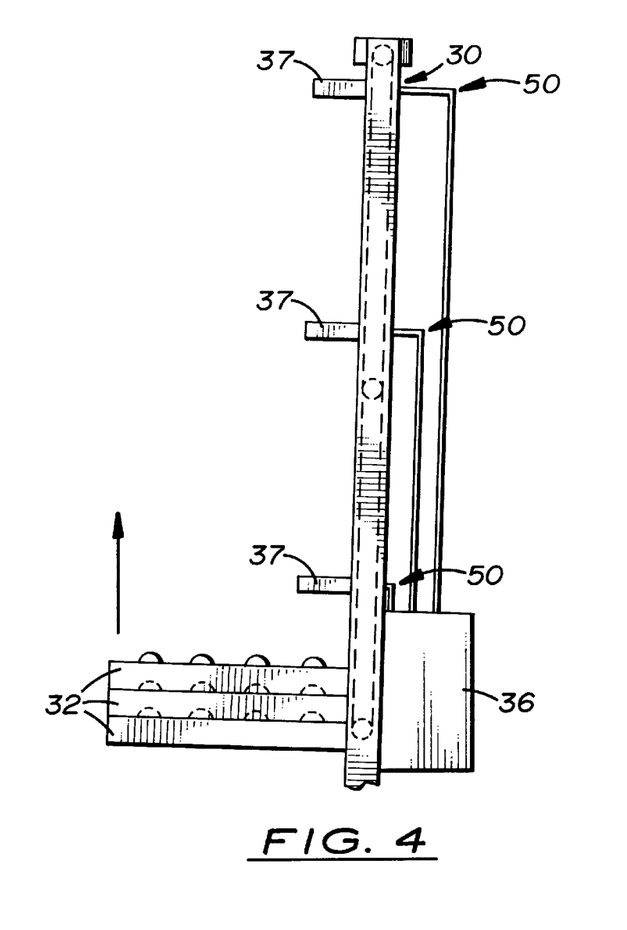
FIG. 4 is a side elevational view of the rack with the shelves emptied and lowered on the rack.
Figure 5:
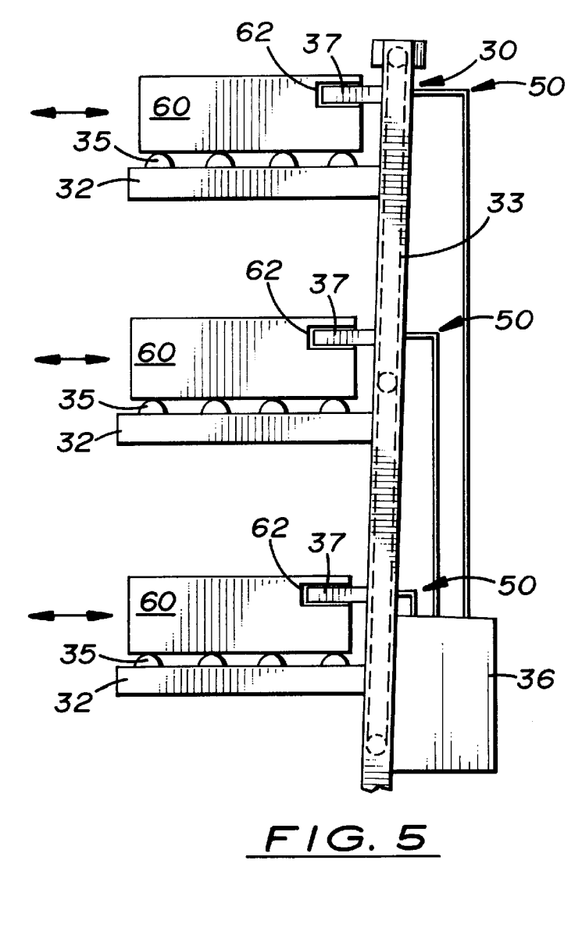
FIG. 5 is a side elevational view of the rack shown in FIG. 4 with the shelves spaced apart and stacked on the rack with a battery placed on each shelf and connected to a recharging unit.

Each shelf 32 includes one recharging unit 50 designed to quickly recharge a battery 60. During operation, a battery 60 is delivered and aligned on the shelf 32 so that the battery's terminals 62 slide into contact with the terminals 37 onto the recharging unit 50. The recharging unit 50 is connected to a recharger 36 which, when activated, recharges the battery 60. The shelves 32 on the rack 30 are designed to be selectively attachable to the vertical support member 33 so that batteries may be continuously added and removed for the rack 30. When a battery 60 is placed on the shelf 32, the shelf 32 is raised on the vehicle support member 33 to make room for additional shelves 32. After a battery is recharged, it remains on the shelf 32 connected to the recharging unit 50 until it is selected for installation into another vehicle. Once selected, the shelf 32 is then lowered so the battery 60 can slide off the top rolling surface 35 on the shelf 32 and onto the elongated conveyor 24 shown in FIG. 1.

When a recharged battery 60 is moved onto the elongated conveyor 24, the direction of the elongated conveyor 24 is reversed so that the recharged battery 60' is delivered to the lifting conveyor platform 20. The recharged battery 60' is then moved onto the lifting conveyor platform 20 which lifts the recharged battery into the electric vehicle 11.

In a second embodiment, shown in FIGS. 8–12, the conveyor platform 20 is replaced by a first pivoting lifting platform 70 with a rolling top surface 72. A central pivoting member 71 is disposed between the rolling top surface 72 and the lower frame member 74 which allows the top rolling surface 72 to pivot thereover. Springs 73 are disposed between the top rolling surface 72 and lower frame member 74 on opposite sides of the central pivoting member 71. When a battery is initially placed in a central position on the platform 70, it is held in a substantial, horizontal position thereon. The lower frame member 74 is attached to a hydraulic lift 76 which raises and lowers the rolling top surface 72 into the pit 16. When a discharged battery 60 is removed from an electric vehicle 11, a pivot arm 78 located adjacent to the top rolling surface 72 is disposed in a vertical position to act as a stop surface 78 to prevent the battery from rolling off the rolling top surface 72. When the first pivoting lifting platform 70 continues downward, it fits inside an opening 81 formed on the end of the elongated rolling platform 80.

Figure 8:
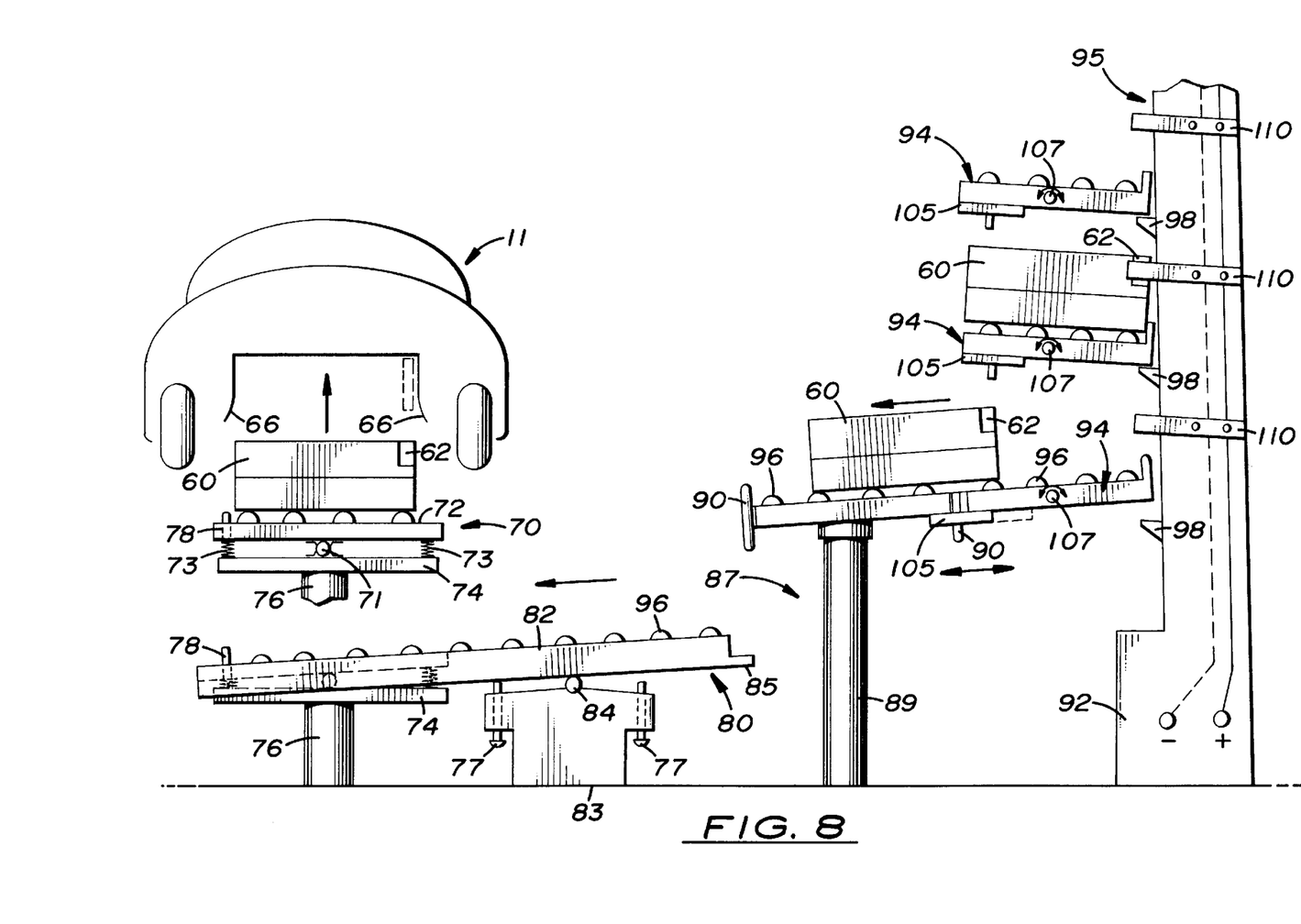
FIG. 8 is a side elevational view of the second embodiment of the pivoting lifting platform, elongated rolling platform, and the end pivoting lifting platform and a battery being removed from a tilting shelf attached to the rack.

During operation, the first pivoting lifting platform 71 is lowered into the opening 81 so that the top rolling surface 72 is aligned with the top rolling surface 82 on the elongated rolling platform 80.

In the second embodiment, the elongated conveyor 24 is replaced with an elongated rolling platform 80 which is longitudinally aligned inside the pit 16. The actual number of elongated rolling platforms 80 used depends on the length of each elongated rolling platform 80 and distance between the pivoting lifting platform 70 and the recharging center 40.

The elongated rolling platform 80 includes a rolling top surface 82 pivotally attached at a pivoting axis 84 to an off-set aligned central member 83. Adjustable stop pins are attached to the central member 83 which acts to limit the angle the elongated rolling platform 80 is disposed over the central member 83. Laterally extending lip 85 is formed on the distal end of the rolling top surface 82, designed to contact the outer edge of the adjacent end lifting platform 87. When the end lifting platform 87 is sufficiently lowered, the adjacent end of the elongated rolling platform 80 is forced downward thereby causing a battery 60 placed on the top rolling surface 82 to move toward the end lifting platform 87.

Located adjacent to the end of the elongated rolling platform 80 opposite to the pivoting lifting platform 70 is an end lifting platform 87. The end lifting platform 87 designed to receive the discharged battery 60 from the elongated rolling platform 80. The end lifting platform 87 includes a top rolling surface 96 and is designed to rotate over a centrally aligned lifting member 89. Attached to each opposite end of the top rolling surface 88 is a stop member 90 which may be selectively adjusted to allow a battery 60 to be moved across the top rolling surface 88.

Figure 11:
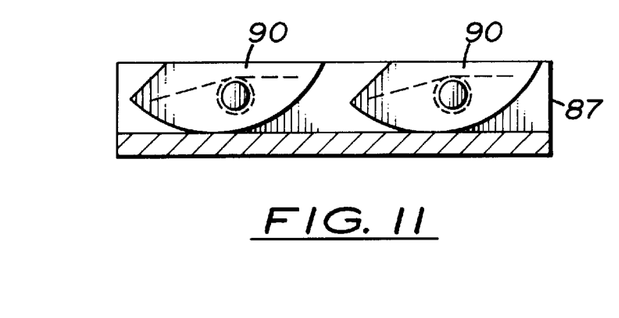
FIG. 11 is a side elevational view showing the end plates retracted.
Figure 12:
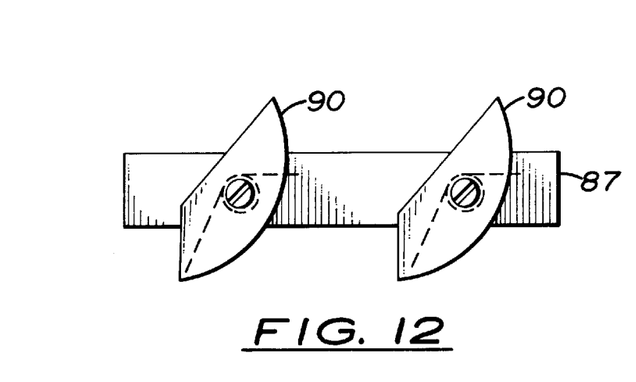
FIG. 12 is a side elevational view showing the end plates extended upward.

As shown in FIGS. 11 and 12, the stop members 90 are rotatably attached to the end of the end lifting platform 87. During use, the stop members 90 are spring loaded and automatically move between an aligned and extended position with the end lifting platform 87.

Figure 9:
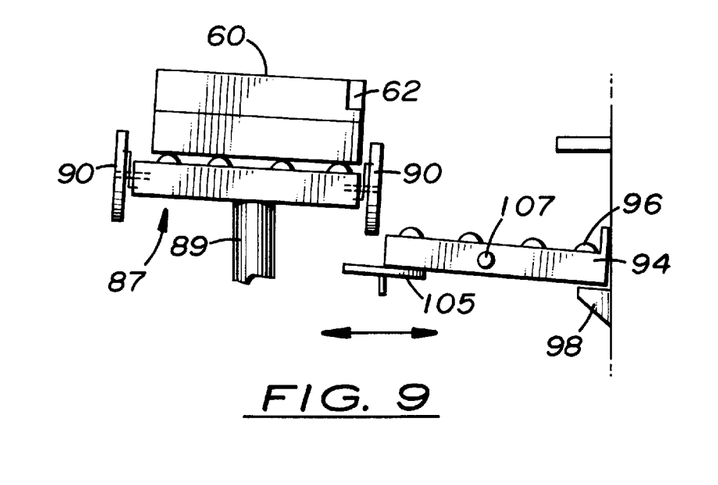
FIG. 9 is a side elevational view of the end pivoting lifting platform being used to deliver a discharged battery on the tilting shelf.
Figure 10:
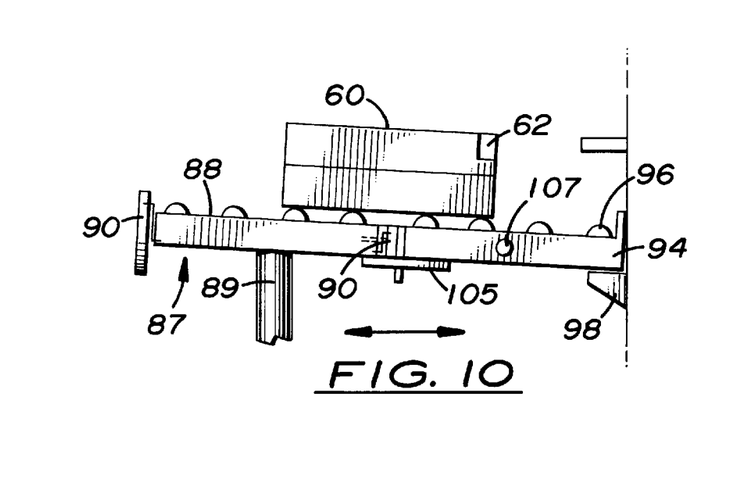
FIG. 10 is a side elevational view, similar to FIG. 9, showing the end pivoting lifting platform and tilting shelf

Inside the recharging center 40 are a plurality of recharging units 92. Each recharging unit 92 includes at least one tilting shelf 94 stacked on a vertically aligned rack 95. Each tilting shelf 94 includes a top rolling surface 96 which allows a battery to move longitudinally there across as shown in FIGS. 8–10. Attached to the lower surface and extending from the distal edge of each tilting shelf 94 is an adjustable slide plate 105. During use, the slide plate 105 is manually moved inward and outward in a direction parallel to the longitudinal axis of the tilting shelf 94 to hold the top rolling platform 88 on the end lifting platform 87 in a longitudinally aligned position with the rolling surface 96 on the tilting shelf 94 so that a battery 60 may be loaded and unloaded therefrom.

Each tilting shelf 94 pivots around an off-set pivoting member 107. The off-set pivot member 107 is attached to the rack 95 so that the tilting shelf 94 slants inward toward the rack 95 thereby causing a battery 60 to automatically move inward when initially placed on the tilting shelf 94. Stop surfaces 98 attached to the rack 95 hold the tilting shelf 94 in an inward slanted position. Terminals 110 located on the recharging unit 92 are positioned above each tilting shelf 94 which engage terminals on the battery 60.

During use, the end lifting platform 87 is longitudinally aligned and slightly above the tilting shelf 94. After the end lifting platform 87 extends above the tilting shelf 94, the slide plate 105 is extended outward. As the end lifting platform 87 is moved downward, the end lifting platform 87 makes contact with the slide plate 105 forcing the tilting shelf 94 to slant downward and away from the rack 95. A battery 60 disposed on the tilting shelf 94 automatically disengages from the terminals 110 and moves downward off the tilting shelf 94 and onto the top rolling surface 88. The stop member 90 located on the end of the end lifting platform 87 opposite the tilting shelf 94 is automatically extended upward to block movement of the battery 60' across the top rolling surface 88.

Once the recharged battery 60' is placed on the top rolling surface 88, the end lifting platform 87 is raised so that the tilting shelf 94 automatically resets in its original, downward slanted position. The slide plate 105 is then retracted so that the end lifting platform 87 may be lowered and aligned with the rolling surface 82 on the elongated rolling platform 80. As shown in FIG. 8, the end lifting platform 87, the elongated rolling platform 80, and the first pivoting lifting platform 70 are slanted and longitudinally aligned so that a recharged battery 60' moves downward on to the first pivoting lifting platform 70.

FIGS. 9–10 illustrate the process of placing a discharged battery 60 onto a tilting shelf 94. A discharged battery 60 is placed on the end lifting platform 87. The step member 90 located on apposite sides of the end lifting platform 87 are extended upward to prevent the battery 60 from rolling off the end lifting platform 87. The end lifting platform 87 is then raised so that the distal end of the rolling surface is slightly above the distal end of the tilting shelf 94. The slide plate 105 is then extended outward and the end lifting platform 87 is lowered so that the rolling surfaces are aligned. The stop member 90 is then retracted thereby allowing the battery 60 to roll freely onto the tilting shelf 94.

Figure 13:
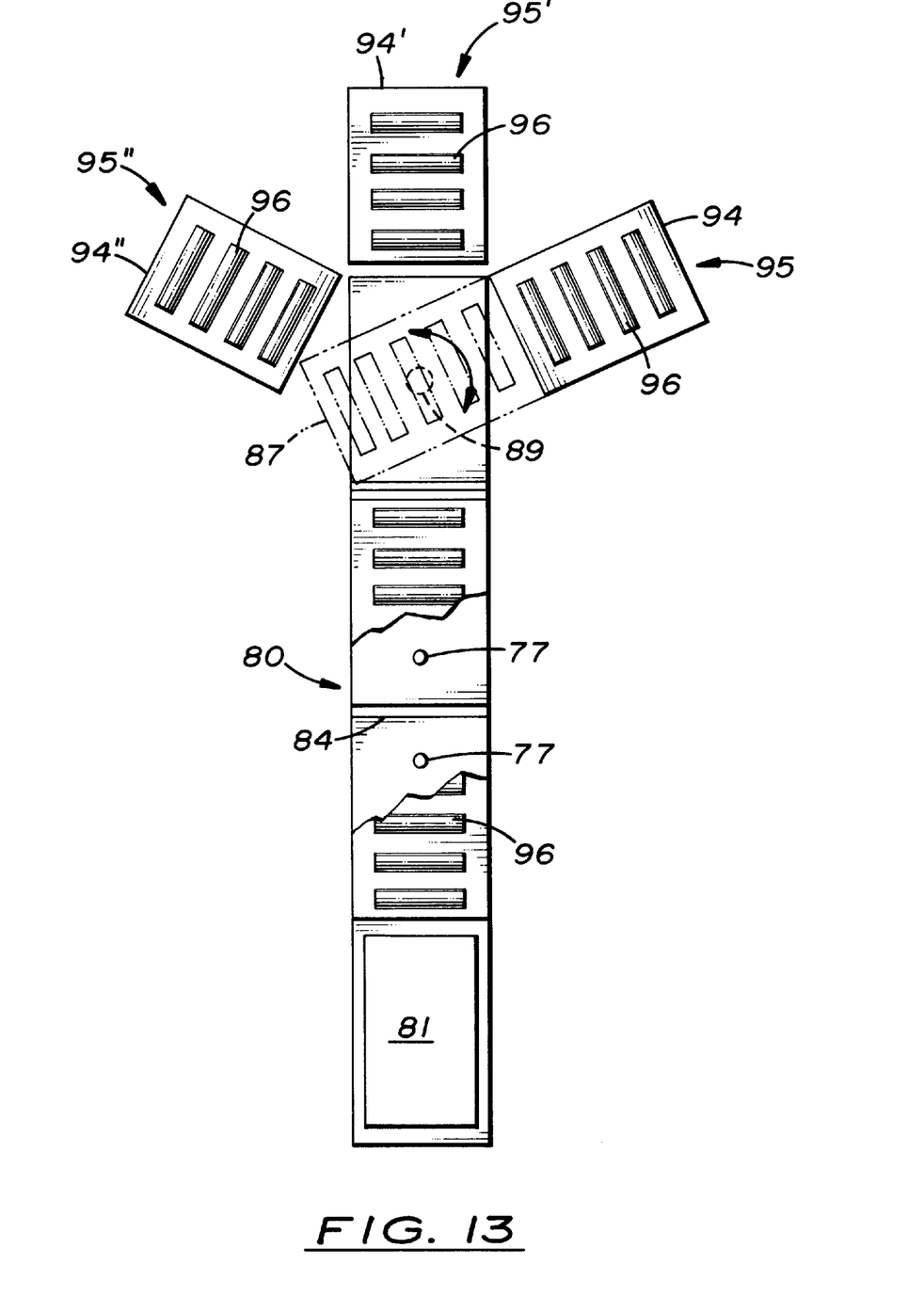
FIG. 13 is a plan view showing the rotation of the end lifting platform around the lifting member and the three tilting shelves radially orientated there around.

FIG. 13 shows three vertically aligned racks 95, 95', 95" radially aligned around the end lifting platform 87. During use, the end lifting platform 87 rotates around the center lift member 89 so that the end lifting platform 87 may be aligned with the tilting shelves 94, 94', 94" on the racks 95, 95', and 95", respectively.

As mentioned above, the electric vehicles must be designed so that batteries may be removed and installed from a battery storage space accessed through the bottom of the vehicle. The type of terminals and their location on the vehicle and the battery must be standardized so that only a minimum number of different batteries are processed.

Figure 6:
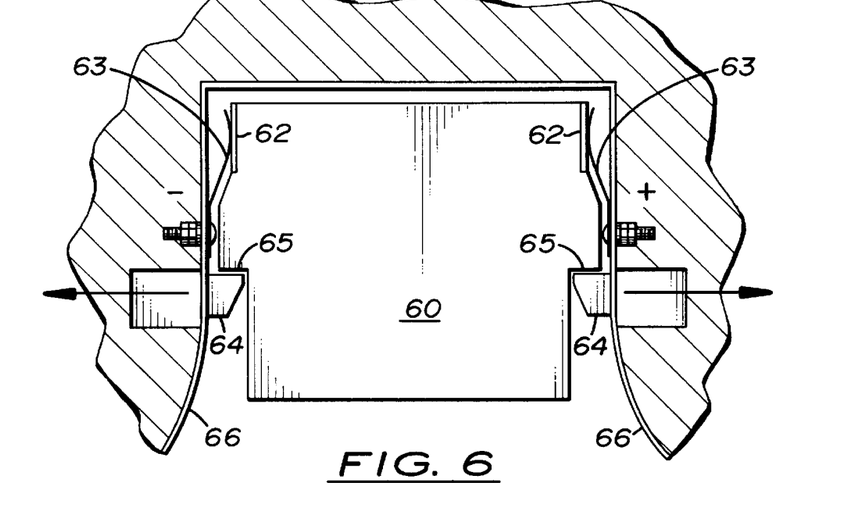
FIG. 6 is a side elevational view in section of a battery locked into the battery receiving space in an electric vehicle.

As shown in FIGS. 6 and 7, the batteries 60 are removed and installed through an opening formed on the bottom surface and into a battery receiving space located in the vehicle. In the embodiment shown, the batteries 60 have terminals located on opposite sides which contact terminals 63 attached to the vehicle when the battery 60 is installed properly in the vehicle. Formed on the opposite sides of the battery are stop surfaces 65 which are engaged by inward extending pins 64 attached to the vehicle. During operation, the pins 64 are extended or retracted to hold or release, respectively, the battery from the vehicle.

Using the above service center 10 and battery 60, a method of using an electric vehicle is disclosed, comprising the following steps: (1) selecting an electric vehicle with a universal battery capable of being used in a plurality of different electric vehicles; (2) driving the electric vehicle into the service center; (3) removing the battery from the electric vehicle (4) replacing the discharged battery with a recharged battery; and (5) recharging the discharged battery.

In compliance with the statute, the invention, described herein, has been described in language more or less specific as to structural features. It should be understood, however, the invention is not limited to the specific features shown, since the means and construction shown comprised only the preferred embodiments for putting the invention into effect. The invention is, therefore, claimed in any of its forms or modifications within the legitimate and valid scope of the amended claims, appropriately interpreted in accordance with the doctrine of equivalents.

I claim:

1. A service center for replacing and recharging an electric batteries from electric vehicles, comprising:
   a. at least one recharging unit capable of recharging a battery removed from an electric vehicle;
   b. a removal-installation means capable of removing and installing the battery from an electric vehicle, said removal-installation means being a pivoting lifting platform; and,
   c. a transporting means capable of transporting a discharged battery from said removal-installation means to said recharging unit, said transporting means also capable of transporting a recharged battery from said recharging unit to said removal-installation means for installation into an electric vehicle.

2. A service center, as recited in claim 1, further including at least one bay upon which an electric vehicle may be driven, said bay including a lower pit in which said removal-installation means and said transporting means are located.

3. A service center, as recited in claim 2, further including said recharging unit being located inside a recharging center and providing access to said recharging unit.

4. A service center, as recited in claim 2, further including a second lifting means disposed between said transporting means and said recharging unit capable of moving a battery between said transporting means and said recharging unit.

5. A service center, as recited in claim 4, wherein said second lifting means is a rack with a plurality of vertically adjustable shelves attached thereto, capable of receiving a battery to be recharged by said recharging unit.

6. A service center, as recited in claim 2, wherein said second lifting means is an end lifting platform.

7. A service center, as recited in claim 6, wherein said end lifting platform rotates around a vertical aligned center member.

8. A service center, as recited in claim 6, further including a vertically aligned rack with a plurality of tilting shelves attached thereto, each said tilting shelf having means for receiving and holding a battery from said end lifting platform.

9. A service center, as recited in claim 1, wherein said removal-installation means is a conveyor lifting platform.

10. A service center, as recited in claim 9, wherein said transporting means is an elongated conveyor.

11. A service center, as recited in claim 1, wherein said transporting means is an elongated rolling platform.

12. A service center, as recited in claim 11, wherein said elongated rolling platform pivots around an off-set axis, said axis being located so that the end closest to said pivoting lifting platform is slanted.

13. A service center, as recited in claim 11, further including said elongated rolling platform having an opening upon which said pivoting lifting platform may engage.

* * * * *